(12) United States Patent
Proudler et al.

(10) Patent No.: US 7,444,601 B2
(45) Date of Patent: *Oct. 28, 2008

(54) TRUSTED COMPUTING PLATFORM

(75) Inventors: Graeme John Proudler, Bristol (GB); Dipankar Gupta, Fort Collins, CO (US); Liqun Chen, Bristol (GB); Siani Lynne Pearson, Bristol (GB); Boris Balacheff, Bristol (GB); Bruno Edgard Van Wilder, Aalst (BE); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 11/249,820

(22) Filed: Oct. 12, 2005

(65) Prior Publication Data

US 2006/0031790 A1  Feb. 9, 2006

Related U.S. Application Data

(63) Continuation of application No. 09/913,452, filed as application No. PCT/GB00/00528 on Feb. 15, 2000, now Pat. No. 6,988,250.

(30) Foreign Application Priority Data

Feb. 15, 1999  (EP) ................................... 99301100
Mar. 5, 1999  (GB) ................................... 9905056.9

(51) Int. Cl.
  *G06F 17/50* (2006.01)
(52) U.S. Cl. ............................... 716/1; 716/16; 716/17; 716/18
(58) Field of Classification Search ..................... 716/1, 716/16, 17, 18
See application file for complete search history.

(56) References Cited

U.S. PATENT DOCUMENTS

| | | | |
|---|---|---|---|
| 5,361,359 A | 11/1994 | Tajalli et al. ................. 395/700 |
| 5,421,006 A | 5/1995 | Jablon et al. ................. 395/575 |
| 5,444,850 A | 8/1995 | Chang ...................... 395/200.1 |
| 5,680,547 A | 10/1997 | Chang ...................... 395/200.1 |
| 5,805,712 A | 9/1998 | Davis ......................... 380/50 |
| 5,815,665 A | 9/1998 | Teper et al. ............ 395/200.59 |
| 5,844,986 A | 12/1998 | Davis ............................ 380/4 |
| 5,892,900 A | 4/1999 | Ginter et al. ................. 713/200 |
| 6,092,202 A * | 7/2000 | Veil et al. ...................... 726/27 |
| 6,138,239 A | 10/2000 | Veil ........................... 713/200 |
| 6,185,678 B1 | 2/2001 | Arbaugh et al. ................. 713/2 |
| 6,327,652 B1 | 12/2001 | England et al. ................. 713/2 |
| 6,330,670 B1 | 12/2001 | England et al. ................. 713/2 |
| 6,473,800 B1 | 10/2002 | Jerger et al. ................. 709/226 |
| 6,609,114 B1 | 8/2003 | Gressel et al. ................. 705/50 |

FOREIGN PATENT DOCUMENTS

| | | |
|---|---|---|
| CA | 2187855 | 6/1997 |
| EP | 0 421 409 A2 | 4/1991 |
| EP | 0 510 244 A1 | 10/1992 |
| EP | 0 825 511 A2 | 2/1998 |
| EP | 0 848 315 A2 | 6/1998 |
| EP | 0 849 657 A1 | 6/1998 |
| EP | 0 893 751 A1 | 1/1999 |
| EP | 1 026 641 A1 | 8/2000 |
| WO | 93/25024 | 12/1993 |
| WO | 95/24696 | 9/1995 |
| WO | 97/07463 | 2/1997 |
| WO | 97/37305 | 10/1997 |
| WO | 98/15082 | 4/1998 |
| WO | 98/25372 | 6/1998 |
| WO | 98/36517 | 8/1998 |
| WO | 98/45778 | 10/1998 |

OTHER PUBLICATIONS

Anderson, R. and Markus Kuhn, "Tamper Resistance—a Cautionary Note," 16 pages, located at Internet address <www.cl.cam.ac.uk/~mgk25/tamper.html> (1996).

Anderson, R. and Markus Kuhn, "Tamper Resistance—a Cautionary Note," *Proceedings of the Second USENIX Workshop on Electronic Commerce*, Oakland CA, pp. 1-11 (Nov. 1996).

Berger, J.L., et al., "Compartmented Mode Workstation: Prototype Highlights," *IEEE Transactions on Software Engineering*, vol. 16, No. 6, pp. 608-618 (Jun. 1990).

Intel, "Wired for Management Baseline specification v2.0," *Boot Integrity Services Application Programming Interface Version 1.0*, 64 pages (Dec. 28, 1998).

"Information technology—Security techniques—Entity Authentication—Part 3: Mechanisms using digital signature techniques," *ISO/IEC 9798-3*, 6 pages (1998).
"Information technology—Security techniques—Key management—Part 3: Mechanisms using asymmetric techniques," *ISO/IEC 11770-3*, pp. 1-23 and Annexes A-E (1999).
The Trusted Computing Platform Alliance, "Building a Foundation of Trust in the PC,", 9 pages, located at Internet address <www.trustedpc.org/home/home.html> (Jan. 2000).
Trusted Computing Platform Alliance, Main Specification Version 1.0, 284 pages (Jan. 25, 2001).
Yee, B., "Using Secure Coprocessors," Doctoral thesis—Carnegie Mellon University, pp. 1-94 (May 1994).

* cited by examiner

*Primary Examiner*—Thuan Do

(57) ABSTRACT

In a computing platform, a trusted hardware device (24) is added to the motherboard (20). The trusted hardware device (24) is configured to acquire an integrity metric, for example a hash of the BIOS memory (29), of the computing platform. The trusted hardware device (24) is tamper-resistant, difficult to forge and inaccessible to other functions of the platform. The hash can be used to convince users that that the operation of the platform (hardware or software) has not been subverted in some way, and is safe to interact with in local or remote applications.

In more detail, the main processing unit (21) of the computing platform is directed to address the trusted hardware device (24), in advance of the BIOS memory, after release from 'reset'. The trusted hardware device (24) is configured to receive memory read signals from the main processing unit (21) and, in response, return instructions, in the native language of the main processing unit (21), that instruct the main processing unit to establish the hash and return the value to be stored by the trusted hardware device (24). Since the hash is calculated in advance of any other system operations, this is a relatively strong method of verifying the integrity of the system. Once the hash has been returned, the final instruction calls the BIOS program and the system boot procedure continues as normal.

Whenever a user wishes to interact with the computing platform, he first requests the integrity metric, which he compares with an authentic integrity metric that was measured by a trusted party. If the metrics are the same, the platform is verified and interactions can continue. Otherwise, interaction halts on the basis that the operation of the platform may have been subverted.

10 Claims, 5 Drawing Sheets

TRUSTED COMPUTING PLATFORM

CROSS-REFERENCE TO RELATED APPLICATIONS

This patent application is a continuation application of U.S. Ser. No. 09/913,452, filed on Dec. 5, 2001 now U.S. Pat. No. 6,988,250, which is the U.S. national stage of PCT application No. PCT/GB00/00528, filed on Feb 15, 2000.

TECHNICAL FIELD

The present invention generally relates to trusted devices, trusted computing platforms, trusted transactions and methods of operating the same.

BACKGROUND ART

For commercial applications, a client computing platform typically operates in an environment where its behaviour is vulnerable to modification by local or remote entities. This potential insecurity of the platform is a limitation on its use by local parties who might otherwise be willing to use the platform, or remote parties who might otherwise communicate with the platform; for example, for the purposes of E-commerce. For the present purposes, both local parties and remote parties will be referred to as "users" unless otherwise stated.

Existing security applications, for example virus detection software, execute on computing platforms under the assumption that the platform will operate as intended and that the platform will not subvert processes and applications. This is a valid assumption provided that the intended software state has not become unstable or has not been damaged by other software such as viruses. Users, therefore, typically restrict the use of such platforms to non-critical applications, and weigh the convenience of using the platforms against the risk to sensitive or business critical data.

Increasing the level of trust in platforms therefore enables greater user confidence in existing security applications (such as the 'Secure Sockets Layer' or 'IPSec') or remote management applications. This enables greater reliance on those applications and hence reduced 'cost of ownership'. Greater trust also enables new electronic methods of business, since there is greater confidence in the correct operation of both local and remote computing platforms.

In this document, the word 'trust' is used in the sense that something can be 'trusted' if it always behaves in the expected manner for the intended purpose.

DISCLOSURE OF THE INVENTION

The present inventors have appreciated that it is desirable to use a physical device in a computing platform to verify and possibly enforce trust in that platform. Typically, the device provides trusted measurement and reporting of attributes of the associated platform, which indicate the integrity of the platform. Also, most preferably, the device is tamper-resistant.

In accordance with a first aspect, the present invention provides computing apparatus comprising, mounted on an assembly, main processing means and main memory means, each being connected for communication with one or more other components on the assembly, together with a trusted device mounted on the assembly and being connected for communications with one or more other components on the assembly, the trusted device being arranged to acquire a true value of an integrity metric of the computing apparatus.

As used herein for reasons of simplicity of description, the term "device" also encompasses plural devices having equivalent function, or equivalent functionality integrated into one or more existing platform devices or assemblies. Additionally, the term 'true' as used herein implies that the value is that which correctly reflects the state of the computing apparatus. This may be ensured if the measurement method is substantially un-modifiable other than by the trusted device.

In accordance with a second aspect, the present invention provides a method of operating a system comprising trusted computing apparatus and a user, the trusted computing apparatus incorporating a trusted device being arranged to acquire the true value of an integrity metric of the computing apparatus, the method comprising the steps of:

the trusted device acquiring the true value of the integrity metric of the trusted computing apparatus;

the user generating a challenge for the trusted computing apparatus to prove its integrity and submitting the challenge to the trusted computing apparatus;

the trusted computing apparatus receiving the challenge, and the trusted device generating a response including the integrity metric and returning the response to the user; and the user receiving the response, extracting the integrity metric from the response and comparing the integrity metric with an authenticated metric for the trusted computing apparatus that had been generated by a trusted party.

In accordance with a third aspect, the present invention provides a method of establishing a communications channel in a system between trusted computing apparatus and remote computing apparatus, the method including the step of the remote computing apparatus verifying the integrity of the trusted computing apparatus using the above method, and maintaining the communications channel for further transactions in the event the integrity of the trusted computing apparatus is successfully verified by the remote computing apparatus.

In accordance with a fourth embodiment, the present invention provides a method of verifying that trusted computing apparatus is trustworthy for use by a user for processing a particular application, the method including the step of the user verifying the integrity of the trusted computing apparatus using the above method, and the user using the trusted computing apparatus to process the particular application in the event the integrity of the trusted computing apparatus is successfully verified by the remote computing apparatus.

Other aspects and embodiments of the present invention will become apparent from the following description and claims.

BRIEF DESCRIPTION OF THE DRAWINGS

A preferred embodiment of the present invention will now be described by way of example only with reference to the accompanying drawings in which.

BEST MODE FOR CARRYING OUT THE INVENTION, & INDUSTRIAL APPLICABILITY

Figure 1:
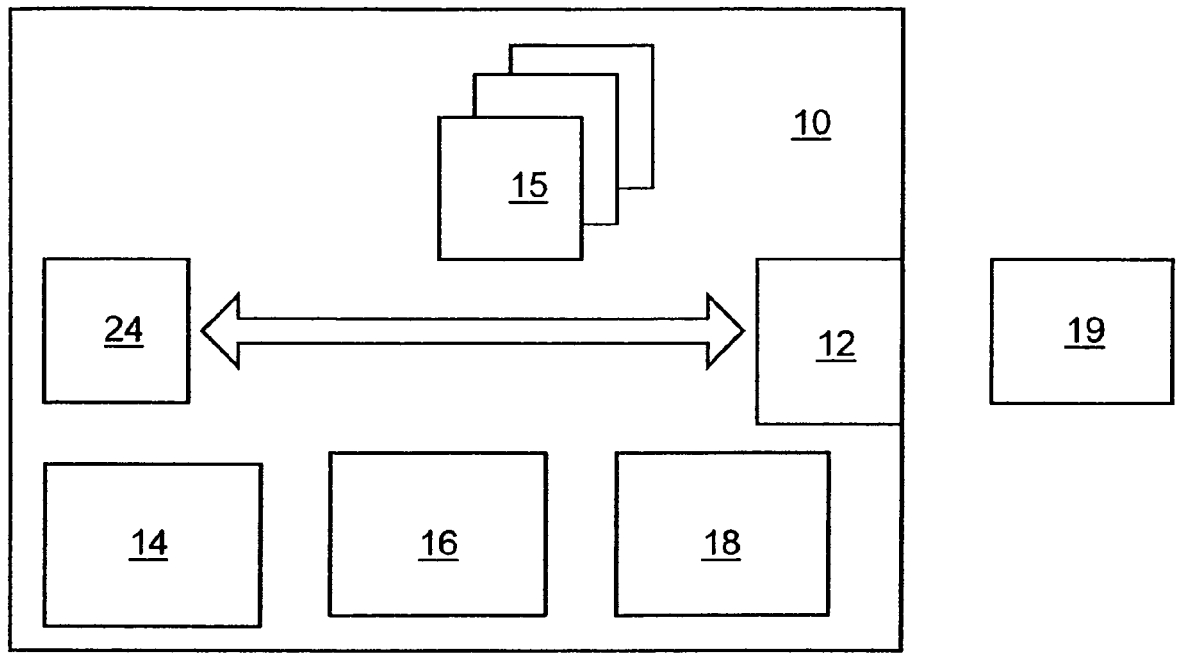
FIG. 1 is a diagram that illustrates a system capable of implementing embodiments of the present invention.

The present exemplary embodiment generally provides the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
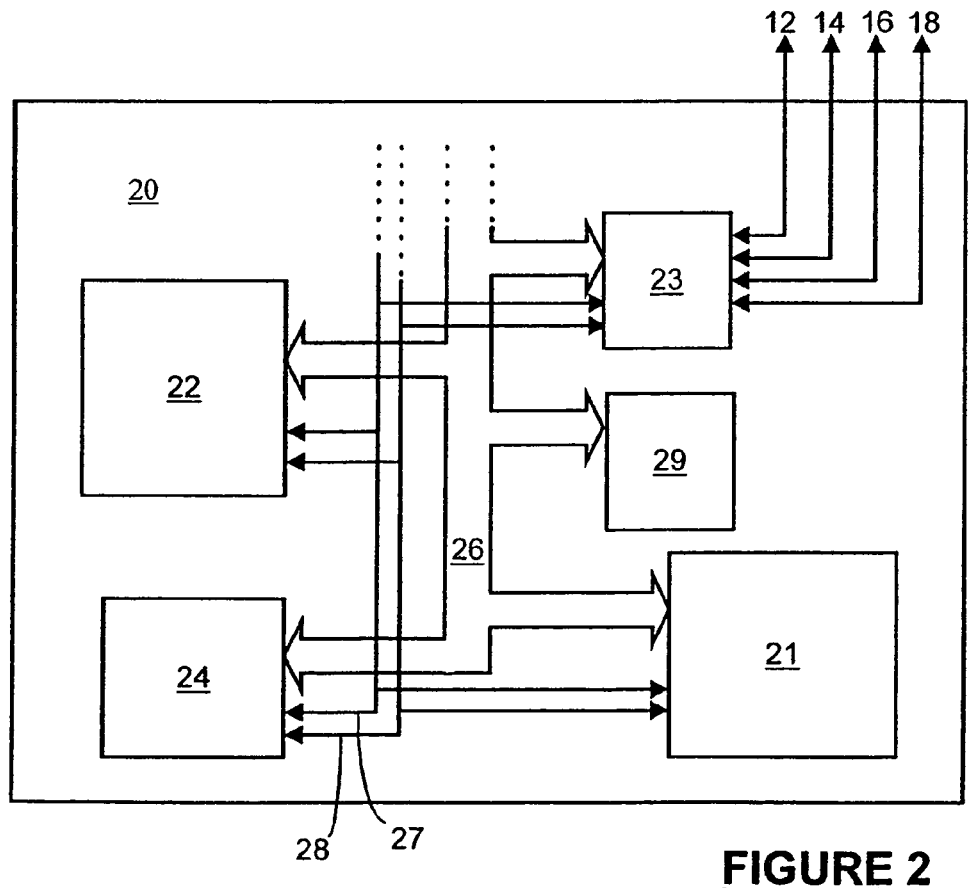
FIG. 2 is a diagram which illustrates a motherboard including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (™), which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
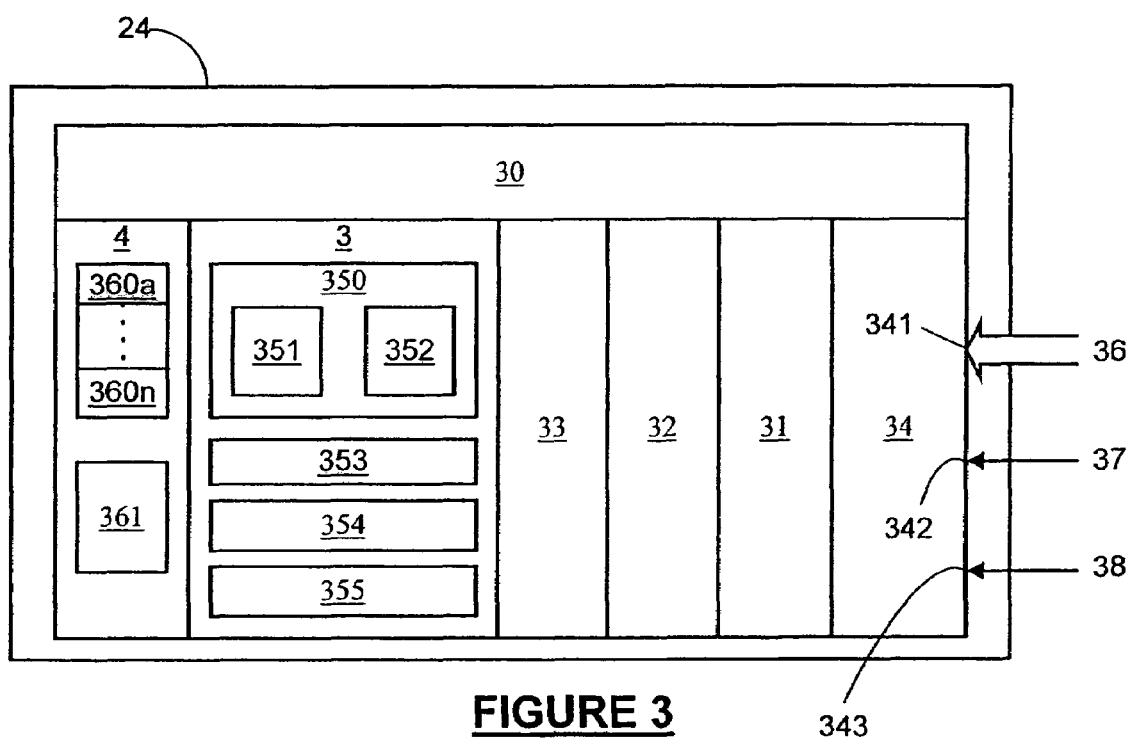
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
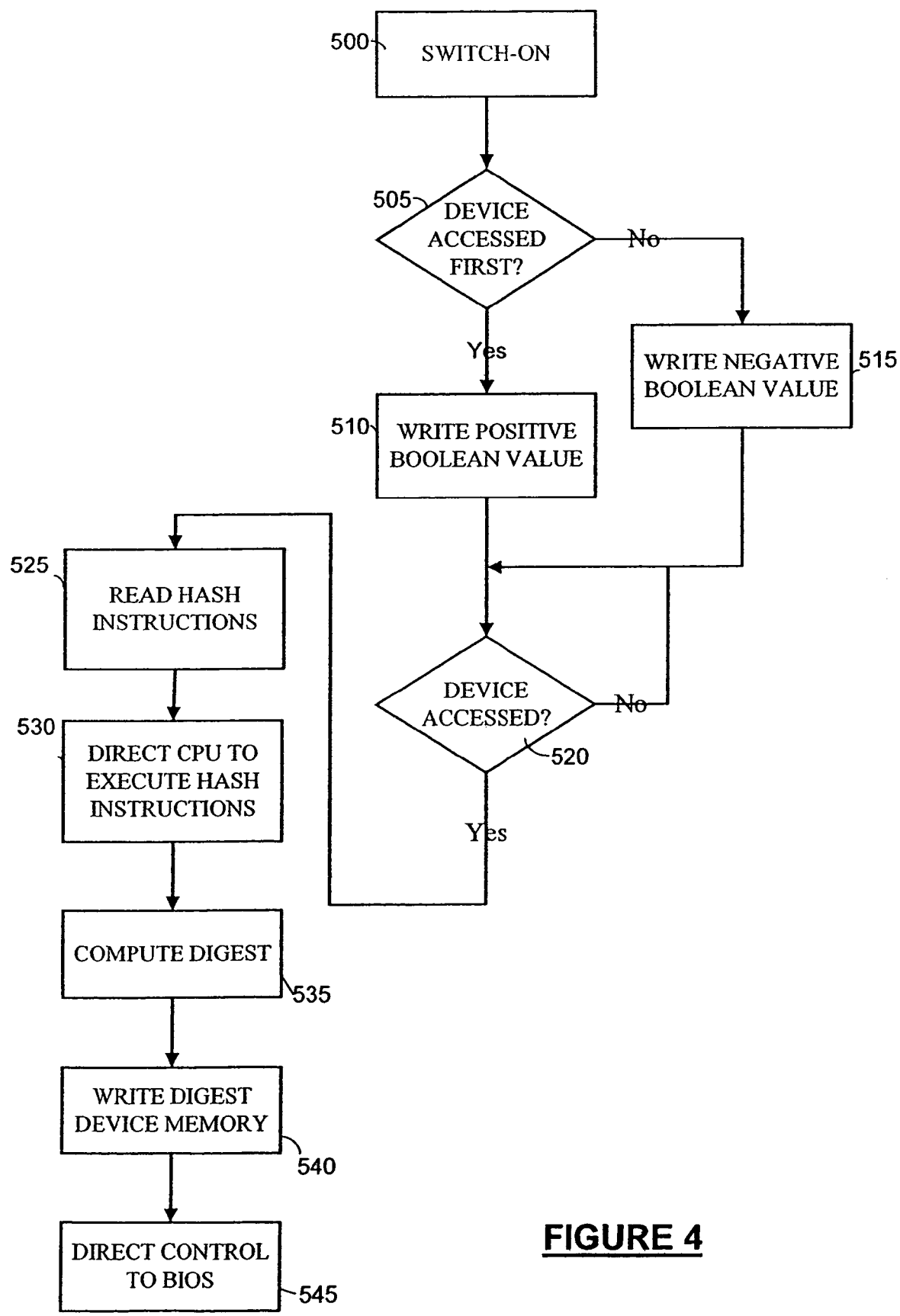
FIG. 4 is a flow diagram which illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value. Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
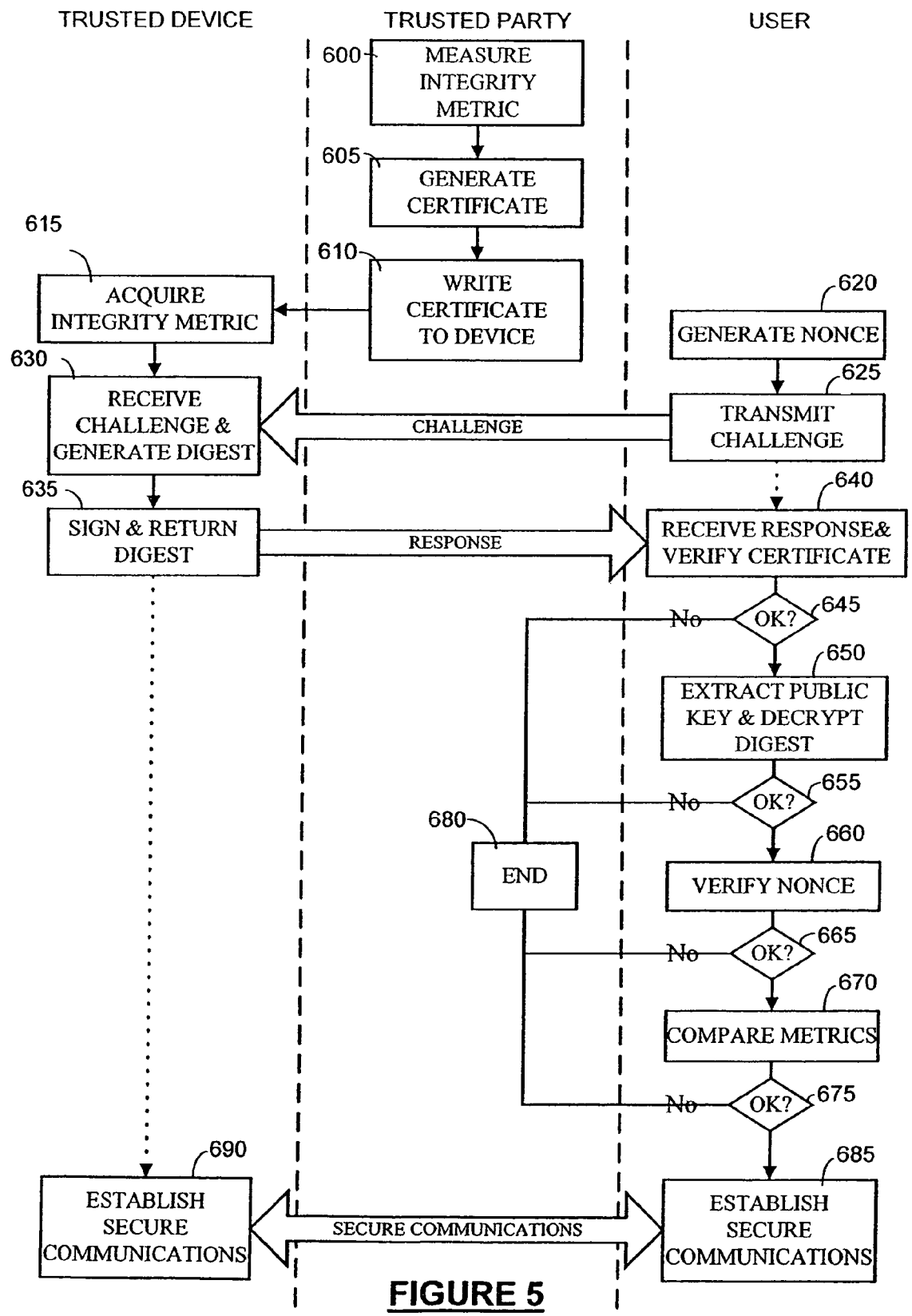
FIG. 5 is a flow diagram which illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform. The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
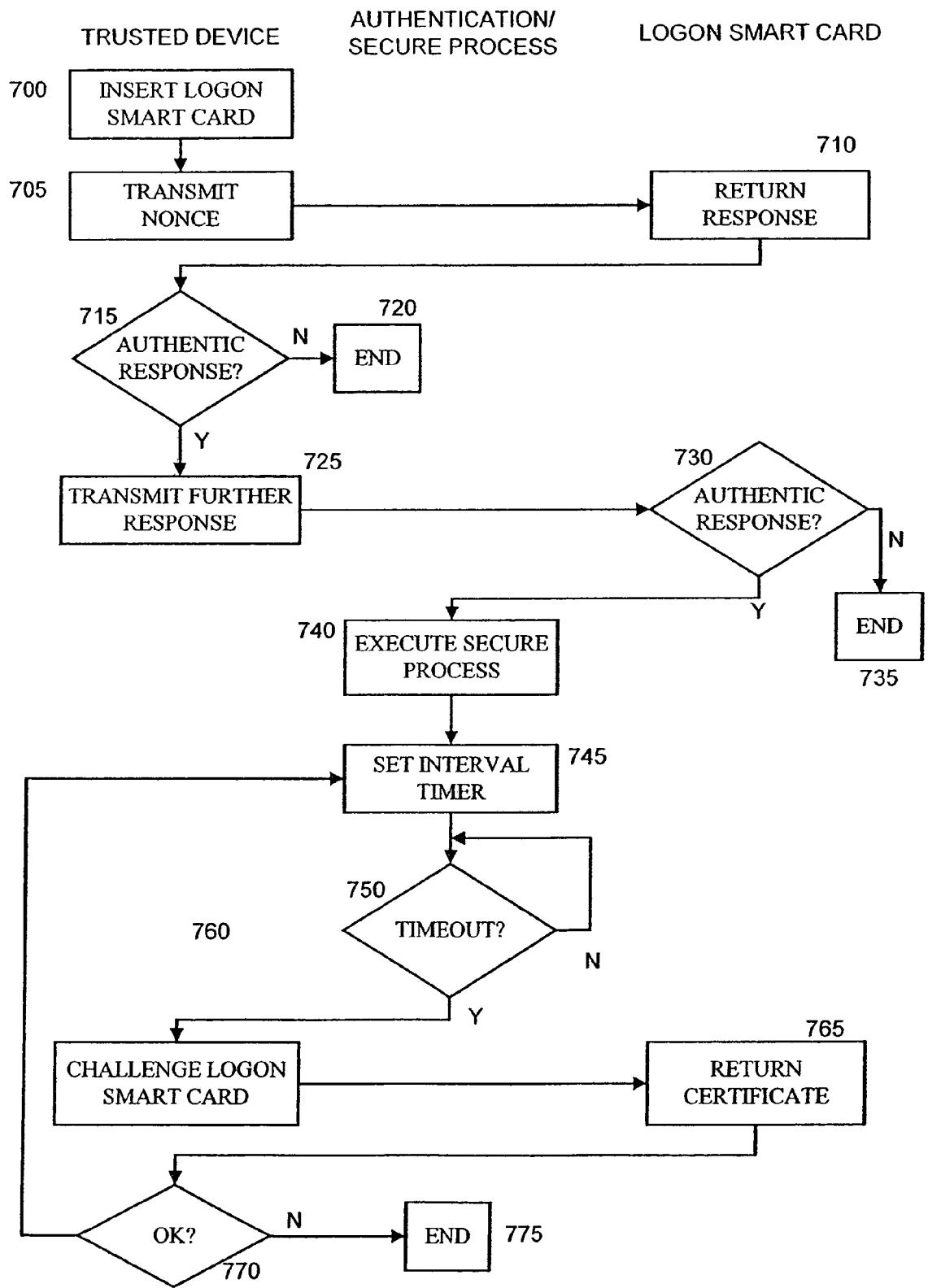
FIG. 6 is a flow diagram which illustrates the steps involved in verification of a trusted computing platform by a potential user of that platform by means of a smart card.

As indicated above, FIG. 6 shows the flow of actions in an example of verification of platform integrity by a user interacting with the trusted platform with a smart card 19. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 1993. Of course, there is no reason why other authentication procedures cannot be used, for example 2-step or 4-step, as also described in this reference.

Initially, the user inserts their smart card 19 into the smart card reader 12 of the platform in step 700.

Beforehand, a platform configured for use by users of in this way will typically be operating under the control of its standard operating system and executing the authentication process, which waits for a user to insert their smart card 19. Apart from the smart card reader 12 being active in this way, such a platform is typically rendered inaccessible to users by 'locking' the user interface (i.e. the screen, keyboard and mouse). This will however not be the case in all embodiments of the invention.

When the smart card 19 is inserted into the smart card reader 12, the trusted device 24 is triggered to attempt mutual authentication in step by generating and transmitting a nonce A to the smart card 19 in step 705. A nonce, such as a random number, is used to protect the originator from deception caused by replay of old but genuine responses (called a 'replay attack') by untrustworthy third parties.

In response, in step 710, the smart card 19 generates and returns a response comprising the concatenation of: the plain text of the nonce A, a new nonce B generated by the smart card 19, an ID of the trusted device 24 and some redundancy; the signature of the plain text, generated by signing the plain text with the private key of the smart card 19; and a certificate containing the ID and the public key of the smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, an ID of the smart card 19 and the acquired integrity metric; the signature of the plain text, generated by signing the plain text using the private key of the trusted device 24; and the certificate comprising the public key of the trusted device 24 and the authentic integrity metric, both signed by the private key of the TP.

The smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the logon card 19 and the smart card 19 has verified the integrity of the trusted platform and, in step 740, the authentication process executes the secure process for the user.

In certain types of interaction, the authentication process can end at this point. However, if a session is to be continued between the user and the trusted platform, it is desirable to ensure that the user remains authenticated to the platform.

Where continued authentication is required, the authentication process sets an interval timer in step 745. Thereafter, using appropriate operating system interrupt routines, the authentication process services the interval timer periodically to detect when the timer meets or exceeds a pre-determined timeout period in step 750.

Clearly, the authentication process and the interval timer run in parallel with the secure process. When the timeout period is met or exceeded, the authentication process triggers the trusted device 24 to re-authenticate the smart card 19, by transmitting a challenge for the smart card 19 to identify itself in step 760. The smart card 19 returns a certificate including its ID and its public key in step 765. In step 770, if there is no response (for example, as a result of the smart card 19 having been removed) or the certificate is no longer valid for some reason (for example, the smart card has been replaced with a different smart card), the session is terminated by the trusted device 24 in step 775. Otherwise, in step 770, the process from step 745 repeats by resetting the interval timer.

Additionally, or alternatively, in some embodiments it may be required that the user profile is encrypted and signed to protect privacy and integrity. If so, a secure data transfer protocol may be needed between the trusted device 24 and the smart card 19. There exist many available mechanisms for transferring secure credentials between two entities. A possible implementation, which may be used in the present embodiment, is secure key transport mechanisms from ISO/IEC DIS 11770-3, "Information technology—Security techniques—Key management—Part 3: Mechanisms using asymmetric techniques", International Organization for Standardization, March 1997.

Modifications of this verification process using other well-known challenge and response techniques can easily be achieved by the skilled person. Similarly, alternative verification processes can be used by parties interacting with the platform in a different manner (that is, other than as a user equipped with a smart card).

The invention claimed is:

1. Computing apparatus comprising, mounted on an assembly, a main processor, a main memory and a trusted device, wherein the trusted device itself comprises a trusted device processor and a trusted device memory, whereby the trusted device processor is arranged to acquire a true value of an integrity metric of the computing apparatus and the trusted device memory contains a certificate signed by a trusted third party, whereby the trusted device is adapted to report the true value of the integrity metric together with the certificate.

2. Computing apparatus according to claim 1, wherein the trusted device has stored in trusted device memory a unique identity of the trusted device and a secret.

3. Computing apparatus according to claim 2, wherein the secret comprises a private encryption key.

4. Computing apparatus according to claim 3, wherein the trusted device memory also contains a respective public encryption key that has been signed by a trusted party.

5. Computing apparatus according to claim 3, wherein the trusted device processor has access to an encryption function and whereby the trusted device is arranged to generate a response to a received challenge, the response comprising the true value of the integrity metric signed by the encryption function using the private asymmetric encryption key.

6. Computing apparatus according to claim 1, wherein the certificate contains a reference value of the integrity metric.

7. Computing apparatus according to claim 1, wherein the certificate contains a public key of the trusted device.

8. A trusted device for use as a functional component in a computing apparatus, the trusted device being adapted for mounting on an assembly of the computing apparatus and comprising:
   an interface for communication with other functional components of the computing apparatus,
   a trusted device processor, and
   a trusted device memory storing a certificate signed by a trusted third party;
   the trusted device being adapted to acquire a true value of an integrity metric of the computing apparatus and to report this true value together with the certificate.

9. A trusted device according to claim 8, wherein the certificate contains a reference value of the integrity metric.

10. A trusted device according to claim 8, wherein the certificate contains a public key of the trusted device.

* * * * *